(12) United States Patent
Zhu et al.

(10) Patent No.: US 11,090,608 B2
(45) Date of Patent: Aug. 17, 2021

(54) SYSTEM AND METHOD FOR DESULFURIZATION AND DENITRIFICATION OF ALUMINA CALCINATION FLUE GAS, AND USE

(71) Applicant: INSTITUTE OF PROCESS ENGINEERING, CHINESE ACADEMY OF SCIENCES, Haidian District (CN)

(72) Inventors: Tingyu Zhu, Haidian District (CN); Xiaolong Liu, Haidian District (CN); Xue Wang, Haidian District (CN); Ruliang Ning, Haidian District (CN)

(73) Assignee: INSTITUTE OF PROCESS ENGINEERING, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 16/768,716

(22) PCT Filed: Mar. 20, 2018

(86) PCT No.: PCT/CN2018/079647
§ 371 (c)(1),
(2) Date: Jun. 1, 2020

(87) PCT Pub. No.: WO2019/119660
PCT Pub. Date: Jun. 27, 2019

(65) Prior Publication Data
US 2021/0170334 A1    Jun. 10, 2021

(30) Foreign Application Priority Data

Dec. 21, 2017  (CN) .......................... 201711391162.2

(51) Int. Cl.
*B01D 53/14* (2006.01)
*B01D 53/18* (2006.01)
(Continued)

(52) U.S. Cl.
CPC ..... *B01D 53/8637* (2013.01); *B01D 53/1431* (2013.01); *B01D 53/185* (2013.01);
(Continued)

(58) Field of Classification Search
CPC .... B01D 53/50; B01D 53/502; B01D 53/507; B01D 53/56; B01D 53/75; B01D 53/80;
(Continued)

(56) References Cited

U.S. PATENT DOCUMENTS 4,341,745 A * 7/1982 Zopff .................... B01D 53/40
                                                            252/191

FOREIGN PATENT DOCUMENTS

CN    101279197    10/2008
CN    105056749    11/2015
(Continued)

OTHER PUBLICATIONS

Office Action issued in priority application CN201711391162.2 dated Mar. 27, 2019.
(Continued)

*Primary Examiner* — Timothy C Vanoy
(74) *Attorney, Agent, or Firm* — Woodard, Emhardt, Henry, Reeves & Wagner, LLP

(57) ABSTRACT

Disclosed are a system and a method for desulfurization and denitrification of an alumina calcination flue gas, and a use. The system comprises an ozone generator, a red mud pre-impregnation slurry scrubbing tower, and a red mud pre-impregnation tank and a red mud pre-impregnation clear liquid scrubbing tower. $NO_x$ in a flue gas is oxidized into a high valence oxynitride by ozone, and with the red mud as
(Continued)

an absorbent, the synergistic absorption of $SO_2$ and $NO_x$ in the flue gas is achieved, while the dealkalization of the red mud is achieved. By means of the synergistic catalytic oxidation of metal ions such as $Fe^{3+}$ in a red mud slurry and ozone, the synergistic absorption of sulfur and oxynitride is prompted; and the use of a structure of staged absorption in two towers overcomes the problem of the difficulty in absorbing $NO_2$ with a low $O_3/NO_x$ molar ratio.

19 Claims, 1 Drawing Sheet

(51) Int. Cl.
    *B01D 53/75* (2006.01)
    *B01D 53/80* (2006.01)
    *B01D 53/86* (2006.01)
    *B01D 53/90* (2006.01)

(52) U.S. Cl.
    CPC .............. *B01D 53/75* (2013.01); *B01D 53/80* (2013.01); *B01D 53/90* (2013.01); *B01D 2251/104* (2013.01); *B01D 2251/304* (2013.01); *B01D 2255/20738* (2013.01); *B01D 2257/302* (2013.01); *B01D 2257/404* (2013.01); *B01D 2258/025* (2013.01); *B01D 2258/0283* (2013.01)

(58) Field of Classification Search
    CPC .......... B01D 2251/00; B01D 2257/302; B01D 2257/404; B01D 2258/00; B01D 2258/0283; C02F 7/02; C02F 7/021; C02F 7/30
    See application file for complete search history.

(56) References Cited

FOREIGN PATENT DOCUMENTS

| | | |
|---|---|---|
| CN | 105903333 | 8/2016 |
| CN | 106215646 | 12/2016 |
| CN | 106345248 | 1/2017 |
| CN | 107008128 | 8/2017 |
| CN | 107281915 | 10/2017 |
| CN | 206730830 | 12/2017 |
| CN | 105879605 | 8/2018 |
| CN | 108215652 | 12/2018 |
| GB | 1038382 | 8/1988 |

OTHER PUBLICATIONS

International Search Report for PCT/CN2018/079647 dated Sep. 3, 2018.

* cited by examiner

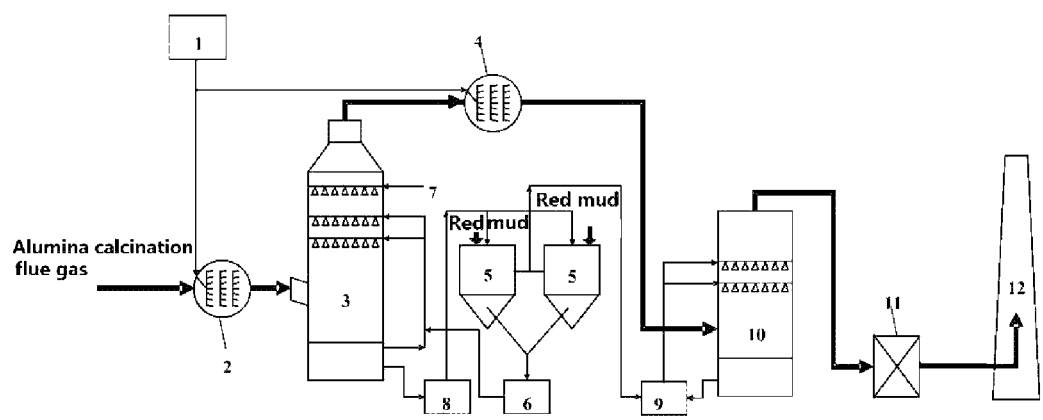

SYSTEM AND METHOD FOR DESULFURIZATION AND DENITRIFICATION OF ALUMINA CALCINATION FLUE GAS, AND USE

TECHNICAL FIELD

The present disclosure belongs to the technical field of pollutant control, and relates to a system and a method for desulfurization and denitrification of alumina calcination flue gas, and a use thereof.

BACKGROUND

The aluminum industry has an extremely important position and role in China's national economy and social development. In an aluminum smelting process, especially an alumina calcination procedure, a large amount of $SO_2$ and $NO_x$ is emitted. A circulating fluidized calciner is commonly used for producing alumina in China. In a calcination process, a large amount of coal gas is consumed, the temperature is as high as about 900° C. to 1100° C., and $SO_2$ is generated in the combustion process of $H_2S$ in the coal gases, with a chimney emission concentration of about 250 mg/m³. At the same time, a large amount of $NO_x$ is generated in the combustion process at a concentration as high as about 400 mg/m³ to 600 mg/m³ which is far higher than a special emission limit of 100 mg/m³ for $SO_2$ and $NO_x$ in "Emission Standard of Pollutant for Aluminum Industry". Therefore, it is necessary to adopt appropriate methods for desulfurization and denitrification of alumina calcination flue gas.

At present, there are few reports on the desulfurization and denitrification of the alumina calcination flue gas. In terms of desulfurization, wet and semi-dry desulfurization technologies, which have been generally applied in China, mostly use a calcium-based desulfurizer as an absorbent, and presents high construction and operation costs. A large amount of red mud solid wastes is discharged in an alumina production process. Generally, an average of 1 ton of alumina is produced with 1 to 2 tons of red mud associated, which contains iron, aluminum, calcium, silicon, sodium alkali and the like in large amounts and has a pH of above 10, and a pH of its leachate is as high as 12 or above. Accordingly, an alumina plant is generally equipped with a red mud heap yard to heap the red mud up. From the perspective of the alumina industry, the red mud solid wastes in the alumina production process are used for the desulfurization of alumina calcination flue gas, and meanwhile the red mud is dealkalized, which greatly promotes the environmental protection development of the entire alumina industry.

In terms of denitrification, current flue gas denitrification technologies mainly include selective non-catalytic reduction (SNCR), selective catalytic reduction (SCR) and oxidative denitrification. The SNCR technology is consisting of spraying ammonia or urea into the flue gas at high temperature range (900° C. to 1100° C.) to reduce $NO_x$ to $N_2$. However, the SNCR has low denitrification efficiency, typically below 50%, and is prone to to ammonia escape. The SCR denitrification technology is consisting of using ammonia or other reductants to reduce $NO_x$ to $N_2$ on a surface of a catalyst under the action of the catalyst to achieve flue gas denitrification. Denitrification efficiency of the SCR may typically reach more than 70%, and the SCR is performed within a temperature range of 300° C. to 400° C. A corresponding temperature window is provided in a circulating fluidized calcination process for producing alumina. However, a content of $H_2O$ in the alumina calcination flue gas may reach more than 30%, which will affect the denitrification efficiency of the SCR; moreover, an SCR reactor needs to be added to a production stage, which will has a potential impact on production processes. An oxidative denitrification technology is consisting of spraying ozone or other types of oxidants to oxidize NO in the flue gas to high-valent oxynitrides such as $NO_2$ or $N_2O_5$ before the flue gas enters a desulfurization tower, to achieve simultaneous desulfurization and denitrification within the desulfurization tower. Therefore, it is expected to achieve the desulfurization and denitrification of the alumina calcination flue gas by combining the oxidative denitrification and a red mud method.

At present, few industrial application of the red mud for flue gas desulfurization and no application of the red mud method for purification of the alumina calcination flue gas have been found. CN105879605A disclosed a method for desulfurizing electrolytic aluminum pre-baked anode calcination flue gas with red mud, in this method, a raw material of the red mud is pre-impregnated in a magnesium-containing desulfurization circulating liquid, and a thick red mud pre-impregnation slurry and a thick red mud pre-impregnation clear liquid are obtained after sedimentation and used as a flue gas desulfurization slurry and a deep desulfurization liquid respectively. The pre-baked anode calcination flue gas after waste heat recovery enters a desulfurization tower for spraying and washing, and then the flue gas is in reverse contact with the red mud pre-impregnation slurry for absorption when passing through a pre-desulfurization area at a lower part of the desulfurization tower, so that 80-90% of $SO_2$ is removed from the flue gas in this area. The flue gas then passes through a partition tower plate and enters a deep desulfurization area for reverse contact with the red mud pre-impregnation clear liquid and absorption to achieve deep desulfurization. Finally, the flue gas is discharged out of the desulfurization tower after being demisted in an efficient demisting area at an upper layer of the desulfurization tower. However, the method can only achieve the flue gas desulfurization, fails to handle $NO_x$ in the flue gas, and requires addition of a magnesium absorbent, resulting in increased operation costs.

In addition, there are few reports on the oxidative denitrification of the alumina calcination flue gas. CN106215652A disclosed a combined denitrification system and method for alumina calcination fuel gas. The combined denitrification system for alumina calcination fuel gas adopts a method combining the SNCR and the oxidative denitrification. The oxidative denitrification is implemented by adding ozone to a low temperature section flue so as to further convert the remaining nitrogen oxides in the flue gas into $NO_2$, followed by a wet raw material drying process. However, the combined denitrification system and method for alumina calcination fuel gas have the following defects: ordinary SNCR effect of alcohol organic matters, weak alkalinity of aluminum materials in the system, and limited absorption of $NO_2$.

SUMMARY

Aiming at the problems including a failure to effectively simultaneously conduct simultaneous desulfurization and denitrification, low desulfurization and denitrification efficiency, and high ozone consumption in an existing alumina calcination flue gas treatment process, and a failure to effectively recycle wastes in an alumina calcination process, the present disclosure provides a system and a method for desulfurization and denitrification of alumina calcination flue gas and a use thereof. The present disclosure conducts desulfurization and denitrification of the alumina calcination flue gas by utilizing double-tower staged absorption with red mud solid wastes generated in an alumina production process as an absorbent and in combination with a synergistic effect of ozone. The method does not need further addition of another additive, has high purification efficiency and can simultaneously achieve flue gas purification and red mud dealkalization.

To achieve the objects, the present disclosure adopts technical solutions described below.

In a first aspect, the present disclosure provides a system for desulfurization and denitrification of alumina calcination flue gas. The system includes an ozone generator, a red mud pre-impregnation slurry scrubbing tower, a red mud pre-impregnation tank and a red mud pre-impregnation clear liquid scrubbing tower. The red mud pre-impregnation slurry scrubbing tower is provided with a spray layer at a upper part, and a flue gas inlet disposed on a tower wall below the spray layer and connected to an alumina calcination flue gas pipeline. The red mud pre-impregnation clear liquid scrubbing tower is provided with a spray layer at a upper part, and a flue gas inlet disposed on a tower wall below the spray layer. A gas outlet at the top of the red mud pre-impregnation slurry scrubbing tower is connected to the flue gas inlet of the red mud pre-impregnation clear liquid scrubbing tower through a pipeline. The red mud pre-impregnation tank is provided with a clear liquid outlet at an upper part and a slurry outlet at a lower part, where the clear liquid outlet is connected to a spray liquid inlet of the spray layer in the red mud pre-impregnation clear liquid scrubbing tower, and the slurry outlet is connected to a spray liquid inlet of the spray layer in the red mud pre-impregnation slurry scrubbing tower. A gas outlet of the ozone generator is connected to the alumina calcination flue gas pipeline and to the pipeline between the gas outlet at the top of the red mud pre-impregnation slurry scrubbing tower and the flue gas inlet of the red mud pre-impregnation clear liquid scrubbing tower, separately.

The system for desulfurization and denitrification of alumina calcination flue gas in the present disclosure conducts the desulfurization and denitrification of the alumina calcination flue gas by merely using red mud solid wastes generated in the alumina production process as the absorbent and in combination with the synergistic effect of ozone, making it possible to achieve the flue gas purification and the red mud dealkalization without adding other additives (such as a magnesium additive).

In an existing oxidative denitrification technology the simultaneous desulfurization and denitrification in the desulfurization tower are achieved by spraying oxidants before the flue gas enters a desulfurization tower to oxidize NO in the flue gas to high-valent oxynitrides such as $NO_2$ or $N_2O_5$. However, such method has an ordinary absorption effect of $NO_2$. To achieve efficient and synergistic absorption of sulfur and nitrate especially when an input $NO_x$ concentration is high, an amount of ozone generally needs to be increased (that is, a large amount of ozone is consumed) to further oxidize $NO_2$ to $N_2O_5$, which will increase operation costs and a risk of ozone escape in turn.

To solve the problem, the present disclosure provides a structure of double-tower staged absorption, where ozone is mixed with the flue gas for oxidation in two steps, that is, NO in the flue gas is oxidized by ozone to generate $NO_2$ and $N_2O_5$, etc., wherein the generated $NO_2$, $N_2O_5$, and $SO_2$ may be absorbed in the red mud pre-impregnation slurry scrubbing tower to generate nitrites, nitrates, sulfites and sulfates, and meanwhile, a portion of NO, $NO_2$ and $SO_2$ are subjected to catalytic oxidation reactions under the combined action of metal ions such as $Fe^{3+}$ in a red mud slurry and ozone, followed by absorption to generate the nitrites, nitrates, sulfites and sulfates. The remaining $NO_x$ in the flue gas may react with ozone when in secondary contact with ozone to generate high-valent oxynitrides, and the oxynitrides and residual $SO_2$ react with sodium alkali contained in a red mud pre-impregnation clear liquid to achieve deep desulfurization and denitrification. Compared with a method of segmented absorption in a single reactor, the method has the advantages that ozone can more fully interact with the flue gas and synergize with components contained in the red mud, thereby performing desulfurization and denitrification more effectively.

At the same time, the use of the structure of double-tower staged absorption in the present disclosure overcomes the problem of a difficulty in absorbing $NO_2$ under a low $O_3/NO_x$ molar ratio and reduces ozone consumption and the risk of ozone escape. Therefore, the device for desulfurization and denitrification of alumina calcination flue gas can achieve efficient, low-cost and stable operations and has high applicability to the alumina calcination flue gas.

Preferred embodiments of the present disclosure are set forth below and not intended to limit the technical solutions of the present disclosure. Technical objects and beneficial effects of the present disclosure can be better achieved through the embodiments set forth below.

As a preferred embodiment of the present disclosure, the system includes a first ozone homogenizer and a second ozone homogenizer. The first ozone homogenizer is disposed on the alumina calcination flue gas pipeline, the second ozone homogenizer is disposed on the pipeline between the gas outlet at the top of the red mud pre-impregnation slurry scrubbing tower and the flue gas inlet of the red mud pre-impregnation clear liquid scrubbing tower, the gas outlet of the ozone generator is connected to the first ozone homogenizer and the second ozone homogenizer, separately, and ozone is homogenized in pipelines by the first ozone homogenizer and the second ozone homogenizer.

Preferably, the system includes a demister and a chimney, and a flue gas outlet at the top of the red mud pre-impregnation clear liquid scrubbing tower is connected to the demister and the chimney in sequence.

As a preferred embodiment of the present disclosure, a red mud pre-impregnation slurry pond is disposed between the slurry outlet of the red mud pre-impregnation tank and the spray liquid inlet of the spray layer in the red mud pre-impregnation slurry scrubbing tower, so as to buffer a red mud pre-impregnation slurry flowing out of the red mud pre-impregnation tank and regulate a flow of the red mud pre-impregnation slurry into the red mud pre-impregnation slurry scrubbing tower.

Preferably, the red mud pre-impregnation clear liquid pond is disposed between the clear liquid outlet of the red mud pre-impregnation tank and the spray liquid inlet of the spray layer in the red mud pre-impregnation clear liquid scrubbing tower, so as to buffer a red mud pre-impregnation clear liquid flowing out of the red mud pre-impregnation tank and regulate a flow of the red mud pre-impregnation clear liquid into the red mud pre-impregnation clear liquid scrubbing tower.

As a preferred embodiment of the present disclosure, the red mud pre-impregnation slurry scrubbing tower is provided with a bottom liquid outlet connected to the spray liquid inlet of the spray layer in the red mud pre-impregnation slurry scrubbing tower.

Preferably, the spray liquid inlet of the spray layer of the red mud pre-impregnation slurry scrubbing tower is connected to a process water pipeline, so as to supplement spray water through the process water pipeline.

Preferably, the bottom liquid outlet of the red mud pre-impregnation slurry scrubbing tower is connected to a material inlet of the red mud pre-impregnation tank.

Preferably, a dewatering pond is disposed between the bottom liquid outlet of the red mud pre-impregnation slurry scrubbing tower and the material inlet of the red mud pre-impregnation tank, and a clear liquid outlet at an upper part of the dewatering pond is connected to the material inlet of the red mud pre-impregnation tank, so that the dewatering pond dewaters a red mud slurry after spraying in the red mud pre-impregnation slurry scrubbing tower to give a clear liquid which is returned to the red mud pre-impregnation tank to be recycled.

Preferably, the red mud pre-impregnation clear liquid scrubbing tower is provided with a bottom liquid outlet connected to the spray liquid inlet of the spray layer in the red mud pre-impregnation clear liquid scrubbing tower.

Preferably, the bottom liquid outlet of the red mud pre-impregnation clear liquid scrubbing tower is connected to a liquid inlet of the red mud pre-impregnation clear liquid pond.

As a preferred embodiment of the present disclosure, the system includes the ozone generator, the first ozone homogenizer, the red mud pre-impregnation slurry scrubbing tower, the second ozone homogenizer, the red mud pre-impregnation tank, the red mud pre-impregnation slurry pond, the process water pipeline, the dewatering pond, the red mud pre-impregnation clear liquid pond, the red mud pre-impregnation clear liquid scrubbing tower, the demister and the chimney.

The red mud pre-impregnation slurry scrubbing tower is provided with the spray layer at a upper part, and a flue gas inlet disposed on a tower wall below the spray layer and connected to an alumina calcination flue gas pipeline provided with the first ozone homogenizer. The red mud pre-impregnation clear liquid scrubbing tower is provided with the spray layer at a upper part, and a flue gas inlet disposed on the tower wall below the spray layer. The gas outlet at the top of the red mud pre-impregnation slurry scrubbing tower is connected to the flue gas inlet of the red mud pre-impregnation clear liquid scrubbing tower through the pipeline provided with the second ozone homogenizer. The red mud pre-impregnation tank is provided with the clear liquid outlet at the upper part and the slurry outlet at the lower part, where the clear liquid outlet is connected to the spray liquid inlet of the spray layer in the red mud pre-impregnation clear liquid scrubbing tower through the red mud pre-impregnation clear liquid pond, and the slurry outlet is connected to the spray liquid inlet of the spray layer in the red mud pre-impregnation slurry scrubbing tower through the red mud pre-impregnation slurry pond. The spray liquid inlet of the spray layer in the red mud pre-impregnation slurry scrubbing tower is connected to the process water pipeline. The gas outlet of the ozone generator is connected to the first ozone homogenizer and the second ozone homogenizer, separately. The flue gas outlet at the top of the red mud pre-impregnation clear liquid scrubbing tower is connected to the demister and the chimney in sequence. The red mud pre-impregnation slurry scrubbing tower is provided with the bottom liquid outlet, where the bottom liquid outlet is connected to the spray liquid inlet of the spray layer in the red mud pre-impregnation slurry scrubbing tower and to the dewatering pond (8), separately, and the clear liquid outlet at the upper part of the dewatering pond (8) is connected to the material inlet of the red mud pre-impregnation tank (5). The red mud pre-impregnation clear liquid scrubbing tower is provided with the bottom liquid outlet, where the bottom liquid outlet is connected to the spray liquid inlet of the spray layer in the red mud pre-impregnation clear liquid scrubbing tower through the red mud pre-impregnation clear liquid pond.

In a second aspect, the present disclosure provides a method for desulfurization and denitrification of alumina calcination flue gas. The method includes the following steps.

(a) The alumina calcination flue gas mixed with ozone is transported to a red mud pre-impregnation slurry scrubbing tower for reverse spraying with a slurry obtained after red mud pre-impregnation, so that a flue gas after a primary treatment and a red mud slurry after the spraying are obtained.

(b) The flue gas after the first treatment in step (a) is mixed with ozone and then transported to a red mud pre-impregnation clear liquid scrubbing tower for reverse spraying with a clear liquid obtained after the red mud pre-impregnation, so that a treated flue gas and a red mud clear liquid after the spraying are obtained.

In the present disclosure, ozone is firstly introduced into the alumina calcination flue gas to oxidize $NO_x$ in the flue gas into high-valent oxynitrides such as $NO_2$ and $N_2O_5$, and the generated $NO_2$, $N_2O_5$, and $SO_2$ are absorbed in the red mud pre-impregnation slurry scrubbing tower to generate nitrites, nitrates, sulfites and sulfates. Meanwhile, part of NO, $NO_2$ and $SO_2$ are subjected to catalytic oxidation reactions under the combined action of metal ions such as $Fe^{3+}$ in the red mud slurry and ozone, and then further absorbed to generate the nitrites, nitrates, sulfites and sulfates.

The remaining $NO_x$ in the flue gas reacts with ozone when in secondary contact with ozone to generate high-valent oxynitrides, the oxynitrides and residual $SO_2$ react with sodium alkali contained in a red mud pre-impregnation clear liquid to achieve deep desulfurization and denitrification.

As a preferred embodiment of the present disclosure, the method is performed by the system for desulfurization and denitrification of alumina calcination flue gas described above.

Preferably, the ozone mixed with the alumina calcination flue gas in step (a) comes from an ozone generator.

Preferably, a molar ratio of the ozone to $NO_x$ in the alumina calcination flue gas in step (a) is (0.4-1.5):1, for example, 0.4:1, 0.5:1, 0.6:1, 0.8:1, 0.9:1, 1.0:1, 1.1:1, 1.2:1, 1.3:1, 1.3:1, 1.4:1 or 1.5:1, etc., but the molar ratio is not limited to the listed values, and other unlisted values within this value range are also applicable. Preferably, the molar ratio is (0.6-1.2):1. In the present disclosure, an amount of ozone used is significantly reduced compared with that in an existing oxidative denitrification technology, and an optimal effect is achieved within a range of (0.6-1.2):1.

Preferably, a pH of the slurry obtained after the red mud pre-impregnation in step (a) is 4-7, for example, 4.0, 4.5, 5.0, 5.5, 6.0, 6.5 or 7.0, etc., but the pH is not limited to the listed values, and other unlisted values within this value range are also applicable. Preferably, the pH is 5-6.

In the present disclosure, the pH of the slurry obtained after the red mud pre-impregnation needs to be controlled within a certain range, which has an effect that sulfites and nitrites in a solution can be oxidized with higher efficiency to sulfates and nitrates with more stable chemical properties under an acidic condition.

Preferably, the red mud pre-impregnation in step (a) includes: pre-impregnating and layering a red mud generated in an alumina calcination process in a red mud pre-impregnation tank (5), where the slurry is obtained at a lower layer, and the clear liquid is obtained at an upper layer.

Preferably, no additives are added during the red mud pre-impregnation, that is, the pre-impregnation is merely performed under the action of sedimentation.

Preferably, the red mud slurry after the spraying in step (a) is dewatered to obtain a clear liquid which is returned for the red mud pre-impregnation to be recycled.

Preferably, the red mud slurry after the spraying in step (a) is returned to a spray layer in the red mud pre-impregnation slurry scrubbing tower as spray water to be recycled.

As a preferred embodiment of the present disclosure, a molar ratio of the ozone to remaining $NO_x$ in the flue gas after the primary treatment in step (b) is (0.1-1.0):1, for example, 0.1:1, 0.2:1, 0.3:1, 0.4:1, 0.5:1, 0.6:1, 0.8:1, 0.9:1 or 1.0:1, etc., but the molar ratio is not limited to the listed values, and other unlisted values within this value range are also applicable. Preferably, the molar ratio is (0.6-0.8):1. An amount of ozone used is significantly reduced compared with that in the existing oxidative denitrification technology, and an optimal effect is achieved within a range of (0.6-0.8):1.

Preferably, a pH of the clear liquid obtained after the red mud pre-impregnation in step (b) is 7.0-12, for example, 7.0, 7.5, 8.0, 8.5, 9.0, 9.5, 10.0, 10.5, 11.0, 11.5 or 12.0, etc., but the pH is not limited to the listed values, and other unlisted values within this value range are also applicable. Preferably, the pH is 9.0-12. In the present disclosure, the pH of the clear liquid obtained after the red mud pre-impregnation needs to be controlled within a certain range, which has an effect that an alkaline solution allows deep removal of $SO_2$ and $NO_x$ with higher efficiency.

Preferably, the red mud clear liquid after the spraying in step (b) is returned to a spray layer in the red mud pre-impregnation clear liquid scrubbing tower as spray water to be recycled.

Preferably, the treated flue gas in step (b) is demisted to obtain a purified flue gas.

Preferably, a content of $SO_2$ in the purified flue gas is less than 8 mg/m$^3$, and a content of oxynitrides in the purified flue gas is less than 90 mg/m$^3$.

As a preferred embodiment of the present disclosure, the method includes the following steps.

(a) The alumina calcination flue gas mixed with the ozone is transported to the red mud pre-impregnation slurry scrubbing tower, where the molar ratio of the ozone to $NO_x$ in the alumina calcination flue gas is (0.6-1.2):1, and the reverse spraying is conducted with a slurry of pH 5-6 which is obtained after the red mud pre-impregnation, so that the flue gas after the primary treatment and the red mud slurry after the spraying are obtained, where a part of the red mud slurry after the spraying is dewatered to obtain the clear liquid which is returned for the red mud pre-impregnation to be recycled, and the other part of the red mud slurry after the spraying is returned to the spray layer in the red mud pre-impregnation slurry scrubbing tower as the spray water to be recycled.

(b) The flue gas after the primary treatment in step (a) is mixed with the ozone and transported to the red mud pre-impregnation clear liquid scrubbing tower, where the molar ratio of the ozone to the remaining $NO_x$ in the flue gas after the primary treatment is (0.6-0.8):1, and the reverse spraying is conducted with a clear liquid of pH 9-12 which is obtained after the red mud pre-impregnation to obtain the treated flue gas and the red mud clear liquid after the spraying, where the red mud clear liquid after the spraying is returned to the spray layer in the red mud pre-impregnation clear liquid scrubbing tower as the spray water to be recycled, and the treated flue gas is demisted to obtain the purified flue gas.

In a third aspect, the present disclosure provides a use of the system described above for desulfurization and denitrification of alumina calcination flue gas.

A value range in the present disclosure includes not only the above-exemplified point values but also any point values within the value range which are not exemplified. Due to space limitations and the consideration of simplicity, specific point values included in the range are not exhaustively listed in the present disclosure.

Compared with the prior art, the present disclosure has the following beneficial effects:

(1) The present disclosure conducts the desulfurization and denitrification of the alumina calcination flue gas by merely using the red mud solid wastes generated in the alumina production process as the absorbent and in combination with the synergistic effect of ozone, making it possible to achieve simultaneous flue gas purification and red mud dealkalization without adding other additives (such as the magnesium additive), and achieving the recycling utilization of the solid wastes.

(2) The present disclosure achieves the synergistic absorption of sulfur and nitrate by utilizing a synergistic catalytic oxidation effect of the metal ions such as $Fe^{3+}$ in the red mud slurry and the ozone, with reduced material consumption for subsequent desulfurization and denitrification, a flue gas desulfurization efficiency of more than 96.8% and an oxynitride removal efficiency of more than 82%.

(3) With the use of the structure of double-tower staged absorption, the present disclosure overcomes the problem of the difficulty in absorbing $NO_2$ at the low $O_3/NO_x$ molar ratio and reduces the ozone consumption and the risk of ozone escape through enhanced absorption by sodium alkali at a second stage, which has advantages of high purification efficiency, low operation costs, etc., and has high applicability to the alumina calcination flue gas.

BRIEF DESCRIPTION OF THE DRAWINGS

FIG. 1 is a schematic structural view of a system for desulfurization and denitrification of alumina calcination flue gas according to Embodiment 1 of the present disclosure.

In the FIGURE, 1—ozone generator, 2—first ozone homogenizer, 3—red mud pre-impregnation slurry scrubbing tower, 4—second ozone homogenizer, 5—red mud pre-impregnation tank, 6—red mud pre-impregnation slurry pond, 7—process water pipeline, 8—dewatering pond, 9—red mud pre-impregnation clear liquid pond, 10—red mud pre-impregnation clear liquid scrubbing tower, 11—demister and 12—chimney.

DETAILED DESCRIPTION

To better illustrate the present disclosure and to facilitate the understanding of the solutions of the present disclosure, the present disclosure is further described in detail below. Embodiments set forth below are merely simple examples of the present disclosure, and are not intended to represent or limit the protection scope of the present disclosure. The protection scope of the present disclosure is defined by the claims.

A system and a method for desulfurization and denitrification of alumina calcination flue gas are provided in the detailed description of the present disclosure. The system includes an ozone generator 1, a red mud pre-impregnation slurry scrubbing tower 3, a red mud pre-impregnation tank 5 and a red mud pre-impregnation clear liquid scrubbing tower 10. The red mud pre-impregnation slurry scrubbing tower 3 is provided with a spray layer at an upper part, and a flue gas inlet disposed on a tower wall below the spray layer and connected to an alumina calcination flue gas pipeline. The red mud pre-impregnation clear liquid scrubbing tower 10 is provided with a spray layer at an upper part, and a flue gas inlet disposed on a tower wall below the spray layer. A gas outlet at the top of the red mud pre-impregnation slurry scrubbing tower 3 is connected to the flue gas inlet of the red mud pre-impregnation clear liquid scrubbing tower 10 through a pipeline. The red mud pre-impregnation tank 5 is provided with a clear liquid outlet at an upper part and a slurry outlet at a lower part, where the clear liquid outlet is connected to a spray liquid inlet of the spray layer in the red mud pre-impregnation clear liquid scrubbing tower 10, and the slurry outlet is connected to a spray liquid inlet of the spray layer in the red mud pre-impregnation slurry scrubbing tower 3. A gas outlet of the ozone generator 1 is connected to the alumina calcination flue gas pipeline and to the pipeline between the gas outlet at the top of the red mud pre-impregnation slurry scrubbing tower 3 and the flue gas inlet of the red mud pre-impregnation clear liquid scrubbing tower 10, separately.

The method includes the following steps.

(a) The alumina calcination flue gas mixed with ozone was transported to the red mud pre-impregnation slurry scrubbing tower 3 for reverse spraying with a slurry obtained after red mud pre-impregnation so that a flue gas after a primary treatment and a red mud slurry after the spraying were obtained.

(b) The flue gas after the primary treatment in step (a) was mixed with the ozone and then transported to the red mud pre-impregnation clear liquid scrubbing tower 10 for reverse spraying with a clear liquid obtained after the red mud pre-impregnation, so that a treated flue gas and a red mud clear liquid after the spraying were obtained.

Typical but non-limiting embodiments of the present disclosure are described below.

Embodiment 1

This embodiment provides a system for desulfurization and denitrification of alumina calcination flue gas. As shown in FIG. 1, the system includes an ozone generator 1, a first ozone homogenizer 2, a red mud pre-impregnation slurry scrubbing tower 3, a second ozone homogenizer 4, a red mud pre-impregnation tank 5, a red mud pre-impregnation slurry pond 6, a process water pipeline 7, a dewatering pond 8, a red mud pre-impregnation clear liquid pond 9, a red mud pre-impregnation clear liquid scrubbing tower 10, a demister 11 and a chimney 12.

The red mud pre-impregnation slurry scrubbing tower 3 is provided with a spray layer at a upper part, and a flue gas inlet disposed on a tower wall below the spray layer and connected to an alumina calcination flue gas pipeline provided with the first ozone homogenizer 2. The red mud pre-impregnation clear liquid scrubbing tower 10 is provided with a spray layer at a upper part, and a flue gas inlet disposed on a tower wall below the spray layer. A gas outlet at the top of the red mud pre-impregnation slurry scrubbing tower 3 is connected to the flue gas inlet of the red mud pre-impregnation clear liquid scrubbing tower 10 through a pipeline provided with the second ozone homogenizer 4. The red mud pre-impregnation tank 5 is provided with a clear liquid outlet at an upper part and a slurry outlet at a lower part, where the clear liquid outlet is connected to a spray liquid inlet of the spray layer in the red mud pre-impregnation clear liquid scrubbing tower 10 through the red mud pre-impregnation clear liquid pond 9, and the slurry outlet is connected to a spray liquid inlet of the spray layer in the red mud pre-impregnation slurry scrubbing tower 3 through the red mud pre-impregnation slurry pond 6. A gas outlet of the ozone generator 1 is connected to the first ozone homogenizer 2 and the second ozone homogenizer 4, separately. A flue gas outlet at the top of the red mud pre-impregnation clear liquid scrubbing tower 10 is connected to the demister 11 and the chimney 12 in sequence. The red mud pre-impregnation slurry scrubbing tower 3 is provided with a bottom liquid outlet, where the bottom liquid outlet is connected to the spray liquid inlet of the spray layer in the red mud pre-impregnation slurry scrubbing tower 3 and to the dewatering pond 8, separately. A clear liquid outlet at an upper part of the dewatering pond 8 is connected to a material inlet of the red mud pre-impregnation tank 5. The red mud pre-impregnation clear liquid scrubbing tower 10 is provided with a bottom liquid outlet, where the bottom liquid outlet is connected to the spray liquid inlet of the spray layer in the red mud pre-impregnation clear liquid scrubbing tower 10 through the red mud pre-impregnation clear liquid pond 9.

Embodiment 2

This embodiment provides a method for desulfurization and denitrification of alumina calcination flue gas. The method is performed by using the system for desulfurization and denitrification of alumina calcination flue gas in embodiment 1, so as to conduct the desulfurization and denitrification on an alumina calciner of 500,000 tons/year, where a concentration of $SO_2$ in the flue gas is 250 mg/m$^3$, and a concentration of $NO_x$ in the flue gas is 500 mg/m$^3$.

The method specifically includes the following steps.

(a) Ozone generated by the ozone generator 1 was mixed with the alumina calcination flue gas through the first ozone homogenizer 2, where a molar ratio of the ozone to $NO_x$ in the alumina calcination flue gas was 0.4:1, the alumina calcination flue gas mixed with the ozone was transported to the red mud pre-impregnation slurry scrubbing tower 3 for reverse spraying with a slurry of pH 4 which was obtained after red mud pre-impregnation in the red mud pre-impregnation tank 5, so that a flue gas after a primary treatment and a red mud slurry after the spraying were obtained, where a part of the red mud slurry after the spraying was dewatered in the dewatering pond 8 to obtain a clear liquid which was returned to the red mud pre-impregnation tank 5 for the red mud pre-impregnation to be recycled, and the other part of the red mud slurry after the spraying was returned to the spray layer in the red mud pre-impregnation slurry scrubbing tower 3 as spray water to be recycled.

(b) The ozone generated by the ozone generator 1 was mixed with the flue gas after the primary treatment in step (a) through the second ozone homogenizer 4, where a molar ratio of the ozone to remaining $NO_x$ in the flue gas after the primary treatment was 0.1:1, the flue gas mixed with the ozone was transported to the red mud pre-impregnation clear liquid scrubbing tower 10 for reverse spraying with a clear liquid pf pH 7 which was obtained after the red mud pre-impregnation in the red mud pre-impregnation tank 5, so that a treated flue gas and a red mud clear liquid after the spraying were obtained, where the red mud clear liquid after the spraying was returned to the spray layer in the red mud pre-impregnation clear liquid scrubbing tower 10 as spray water to be recycled, and the treated flue gas was demisted to obtain purified flue gas.

In this embodiment, the concentration of $SO_2$ in the purified flue gas was 8 $mg/m^3$, and the concentration of $NO_x$ in the purified flue gas was 90 $mg/m^3$.

Embodiment 3

This embodiment provides a method for desulfurization and denitrification of alumina calcination flue gas. The method is performed by using the system for desulfurization and denitrification of alumina calcination flue gas in embodiment 1. The treatment method is similar to that in embodiment 2 except for differences that the molar ratio of the ozone to $NO_x$ in the alumina calcination flue gas was 0.8:1 and a pH of the slurry obtained after the red mud pre-impregnation was 5 in step (a), and the molar ratio of the ozone to the remaining $NO_x$ in the flue gas after the primary treatment was 0.4:1, and a pH of the clear liquid obtained after the red mud pre-impregnation was 9 in step (b).

In this embodiment, the concentration of $SO_2$ in the purified flue gas was 6 $mg/m^3$, and the concentration of $NO_x$ in the purified flue gas was 60 $mg/m^3$.

Embodiment 4

This embodiment provides a method for desulfurization and denitrification of alumina calcination flue gas. The method is performed by using the system for desulfurization and denitrification of alumina calcination flue gas in embodiment 1. The treatment method is similar to that in embodiment 2 except for differences that the molar ratio of the ozone to $NO_x$ in the alumina calcination flue gas was 1:1 and a pH of the slurry obtained after the red mud pre-impregnation was 6 in step (a), and the molar ratio of the ozone to the remaining $NO_x$ in the flue gas after the primary treatment was 0.6:1, and a pH of the clear liquid obtained after the red mud pre-impregnation was 10 in step (b).

In this embodiment, the concentration of $SO_2$ in the purified flue gas was 5 $mg/m^3$, and the concentration of $NO_x$ in the purified flue gas was 50 $mg/m^3$.

Embodiment 5

This embodiment provides a method for desulfurization and denitrification of alumina calcination flue gas. The method is performed by using the system for desulfurization and denitrification of alumina calcination flue gas in embodiment 1. The treatment method is similar to that in embodiment 2 except for differences that the molar ratio of the ozone to $NO_x$ in the alumina calcination flue gas was 1.5:1 and a pH of the slurry obtained after the red mud pre-impregnation was 7 in step (a), and the molar ratio of the ozone to the remaining $NO_x$ in the flue gas after the primary treatment was 1:1, and a pH of the clear liquid obtained after the red mud pre-impregnation was 12 in step (b).

In this embodiment, the concentration of $SO_2$ in the purified flue gas was 3 $mg/m^3$, and the concentration of $NO_x$ in the purified flue gas was 45 $mg/m^3$.

COMPARATIVE EXAMPLE 1

This comparative example provides a method for desulfurization and denitrification of alumina calcination flue gas. The method is similar to that in embodiment 2 except for that a red mud method in a purification system in an apparatus used was replaced with a limestone-gypsum method, that is, the spray liquid was a liquid obtained by the limestone-gypsum method.

In this comparative example, the concentration of $SO_2$ in purified flue gas was 25 $mg/m^3$, and the concentration of $NO_x$ in the purified flue gas was 180 $mg/m^3$. It can be seen that oxynitrides in the flue gas cannot be removed by using the liquid in the limestone-gypsum method as the spray liquid.

COMPARATIVE EXAMPLE 2

This comparative example provides a method for desulfurization and denitrification of alumina calcination flue gas. The method is similar to that in embodiment 2 except for that neither the second ozone homogenizer was disposed in an apparatus used nor ozone was sprayed, that is, the flue gas after the primary treatment, without being mixed with the ozone, was directly transported to the red mud pre-impregnation clear liquid scrubbing tower 10 for the reverse spraying with the clear liquid obtained after the red mud pre-impregnation.

In this comparative example, the concentration of $SO_2$ in purified flue gas was 20 $mg/m^3$, and the concentration of $NO_x$ in the purified flue gas was 150 $mg/m^3$. It can be seen that oxynitrides in the flue gas after the primary treatment cannot be effectively removed.

COMPARATIVE EXAMPLE 3

This comparative example provides a method for desulfurization and denitrification of alumina calcination flue gas. The method is similar to that in embodiment 2 except for that neither the first ozone homogenizer was disposed in an apparatus used nor ozone was sprayed, that is, the alumina calcination flue gas, without being mixed with the ozone, was directly transported to the red mud pre-impregnation slurry scrubbing tower 3 for the reverse spraying with the slurry obtained after the red mud pre-impregnation.

In this comparative example, the concentration of $SO_2$ in purified flue gas was 10 $mg/m^3$, and the concentration of $NO_x$ in the purified flue gas was 180 $mg/m^3$.

It can be seen by summarizing the embodiments and comparative examples described above that the present disclosure conducts the desulfurization and denitrification of the alumina calcination flue gas by merely using red mud solid wastes generated in an alumina production process as an absorbent and in combination with a synergistic effect of ozone, making it possible to achieve simultaneous flue gas purification and red mud dealkalization without adding other additives (such as a magnesium additive), which, and achieving the utilization of the solid wastes.

Moreover, the present disclosure achieves the synergistic absorption of sulfur and nitrate by utilizing a synergistic catalytic oxidation effect of metal ions such as $Fe^{3+}$ in the red mud slurry and the ozone, with reduced material consumption for subsequent desulfurization and denitrification, a flue gas desulfurization efficiency of more than 96.8% and an oxynitride removal efficiency of more than 82%.

With the use of a structure of double-tower staged absorption, the present disclosure overcomes the problem of a difficulty in absorbing $NO_2$ at a low $O_3/NO_x$ molar ratio and reduces ozone consumption and a risk of ozone escape through enhanced absorption by sodium alkali at a second stage, which has advantages of high purification efficiency, low operation costs, etc., and has high applicability to the alumina calcination flue gas.

The applicant has stated that although the detailed process equipment and flows of the present disclosure are described through the embodiments described above, the present disclosure is not limited to the detailed process equipment and flows described above, which means that the implementation of the present disclosure does not necessarily depend on the detailed process equipment and flows described above. It should be apparent to those skilled in the art that any improvements made to the present disclosure, equivalent replacements of various raw materials, the addition of adjuvant ingredients, and the selection of specific manners, etc. in the present disclosure all fall within the protection scope and the scope of disclosure of the present disclosure.

What is claimed is:

1. A system for desulfurization and denitrification of alumina calcination flue gas, comprising: an ozone generator, a red mud pre-impregnation slurry scrubbing tower, a red mud pre-impregnation tank and a red mud pre-impregnation clear liquid scrubbing tower; wherein the red mud pre-impregnation slurry scrubbing tower is provided with a spray layer at a upper part, and a flue gas inlet disposed on a tower wall below the spray layer and connected to an alumina calcination flue gas pipeline; the red mud pre-impregnation clear liquid scrubbing tower is provided with a spray layer at a upper part, and a flue gas inlet disposed on a tower wall below the spray layer; a gas outlet at the top of the red mud pre-impregnation slurry scrubbing tower is connected to the flue gas inlet of the red mud pre-impregnation clear liquid scrubbing tower through a pipeline; the red mud pre-impregnation tank is provided with a clear liquid outlet at an upper part and a slurry outlet at a lower part, wherein the clear liquid outlet is connected to a spray liquid inlet of the spray layer in the red mud pre-impregnation clear liquid scrubbing tower, and the slurry outlet is connected to a spray liquid inlet of the spray layer in the red mud pre-impregnation slurry scrubbing tower; and a gas outlet of the ozone generator is connected to the alumina calcination flue gas pipeline and to the pipeline between the gas outlet at the top of the red mud pre-impregnation slurry scrubbing tower and the flue gas inlet of the red mud pre-impregnation clear liquid scrubbing tower, separately.

2. The system of claim 1, comprising: a first ozone homogenizer and a second ozone homogenizer, wherein the first ozone homogenizer is disposed on the alumina calcination flue gas pipeline, the second ozone homogenizer is disposed on the pipeline between the gas outlet at the top of the red mud pre-impregnation slurry scrubbing tower and the flue gas inlet of the red mud pre-impregnation clear liquid scrubbing tower, the gas outlet of the ozone generator is connected to the first ozone homogenizer and the second ozone homogenizer, separately, and ozone is homogenized in pipelines by the first ozone homogenizer and the second ozone homogenizer.

3. The system of claim 1, comprising: a demister and a chimney, wherein a flue gas outlet at the top of the red mud pre-impregnation clear liquid scrubbing tower is connected to the demister and the chimney in sequence.

4. The system of claim 1, wherein a red mud pre-impregnation slurry pond is disposed between the slurry outlet of the red mud pre-impregnation tank and the spray liquid inlet of the spray layer in the red mud pre-impregnation slurry scrubbing tower.

5. The system of claim 1, wherein the red mud pre-impregnation slurry scrubbing tower is provided with a bottom liquid outlet connected to the spray liquid inlet of the spray layer in the red mud pre-impregnation slurry scrubbing tower.

6. The system of claim 1, wherein a red mud pre-impregnation clear liquid pond is disposed between the clear liquid outlet of the red mud pre-impregnation tank and the spray liquid inlet of the spray layer in the red mud pre-impregnation clear liquid scrubbing tower.

7. The system of claim 1, wherein the spray liquid inlet of the spray layer in the red mud pre-impregnation slurry scrubbing tower is connected to a process water pipeline.

8. The system of claim 1, wherein the bottom liquid outlet of the red mud pre-impregnation slurry scrubbing tower is connected to a material inlet of the red mud pre-impregnation tank.

9. The system of claim 1, wherein a dewatering pond is disposed between the bottom liquid outlet of the red mud pre-impregnation slurry scrubbing tower and the material inlet of the red mud pre-impregnation tank, and a clear liquid outlet at an upper part of the dewatering pond is connected to the material inlet of the red mud pre-impregnation tank.

10. The system of claim 1, wherein the red mud pre-impregnation clear liquid scrubbing tower is provided with a bottom liquid outlet connected to the spray liquid inlet of the spray layer in the red mud pre-impregnation clear liquid scrubbing tower.

11. The system of claim 1, wherein preferably, the bottom liquid outlet of the red mud pre-impregnation clear liquid scrubbing tower is connected to a liquid inlet of the red mud pre-impregnation clear liquid pond.

12. A method for desulfurization and denitrification of alumina calcination flue gas, comprising:
  (a) transporting the alumina calcination flue gas mixed with ozone to a red mud pre-impregnation slurry scrubbing tower for reverse spraying with a slurry obtained after red mud pre-impregnation, so as to obtain a flue gas after a primary treatment and a red mud slurry after the spraying; and
  (b) mixing the flue gas after the first treatment in step (a) with ozone before transporting to a red mud pre-impregnation clear liquid scrubbing tower for reverse spraying with a clear liquid obtained after the red mud pre-impregnation, so as to obtain a treated flue gas and a red mud clear liquid after the spraying.

13. The method of claim 12, wherein the method is performed by the system for desulfurization and denitrification of alumina calcination flue gas of claim 1.

14. The method of claim 12, wherein a molar ratio of the ozone to remaining $NO_x$ in the flue gas after the primary treatment in step (b) is (0.1-1.0):1.

15. The method of claim 12 wherein a molar ratio of the ozone to $NO_x$ in the alumina calcination flue gas in step (a) is (0.4-1.5):1.

16. The method of claim 12 wherein the red mud pre-impregnation in step (a) comprises: pre-impregnating and layering a red mud generated in an alumina calcination process in a red mud pre-impregnation tank, wherein the slurry is obtained at a lower layer, and the clear liquid is obtained at an upper layer.

17. The method of claim 12 wherein no additives are added during the red mud pre-impregnation.

18. The method of claim 12 wherein a pH of the clear liquid obtained after the red mud pre-impregnation in step (b) is 7-12.

19. The method of claim 12 wherein the red mud clear liquid after the spraying in step (b) is returned to a spray layer in the red mud pre-impregnation clear liquid scrubbing tower as spray water to be recycled.

* * * * *